United States Patent [19]

Haas

[11] 4,083,166

[45] Apr. 11, 1978

[54] MULCHER ATTACHMENT FOR ROTARY POWER MOWER

[75] Inventor: Phil Haas, Charlotte, N.C.

[73] Assignee: Walter Russel Betenbaugh, Jr., Charlotte, N.C.

[21] Appl. No.: 734,252

[22] Filed: Oct. 20, 1976

[51] Int. Cl.² ............................................. A01D 55/00
[52] U.S. Cl. ...................................... 56/13.7; 56/255; 56/503
[58] Field of Search ............... 56/295, 255, 13.7, 13.4, 56/12.8, 501, 503

[56] References Cited

U.S. PATENT DOCUMENTS

| | | | |
|---|---|---|---|
| 2,663,984 | 12/1953 | Clark | 56/13.7 |
| 2,737,003 | 3/1956 | Beers | 56/501 |
| 2,786,318 | 3/1957 | Caldwell et al. | 56/13.7 |
| 2,836,024 | 5/1958 | Davis et al. | 56/13.7 |
| 3,091,906 | 6/1963 | Hall | 56/13.4 |
| 3,531,923 | 10/1970 | DeLay | 56/12.8 |
| 3,959,954 | 6/1976 | Halsten | 56/12.8 |

Primary Examiner—Russell R. Kinsey
Attorney, Agent, or Firm—Bell, Seltzer, Park & Gibson

[57] ABSTRACT

A mulcher attachment for use with a rotary mower for shredding and mulching the clippings produced during operation of the mower. The mulcher attachment comprises a circular disc mounted on the drive shaft of the rotary mower for rotation alongside the mower blade. A plurality of relatively large openings are provided at spaced locations around the disc with an upwardly extending impeller blade adjacent each of the openings and serving for inducing a flow of air upwardly through the openings as the disc rotates while drawing clippings, leaves and other waste therewith. A series of shredder blades are integrally formed along the peripheral edge of the disc and have cutting edges extending above the upper surface of the disc adapted for shredding and mulching the clippings, leaves and other waste as these materials are cast centrifugally outwardly during rotation of the disc. A cutting edge may also be provided along the uppermost edge of each impeller blade for cutting and shredding the materials drawn upwardly through the openings during rotation of the disc.

12 Claims, 10 Drawing Figures

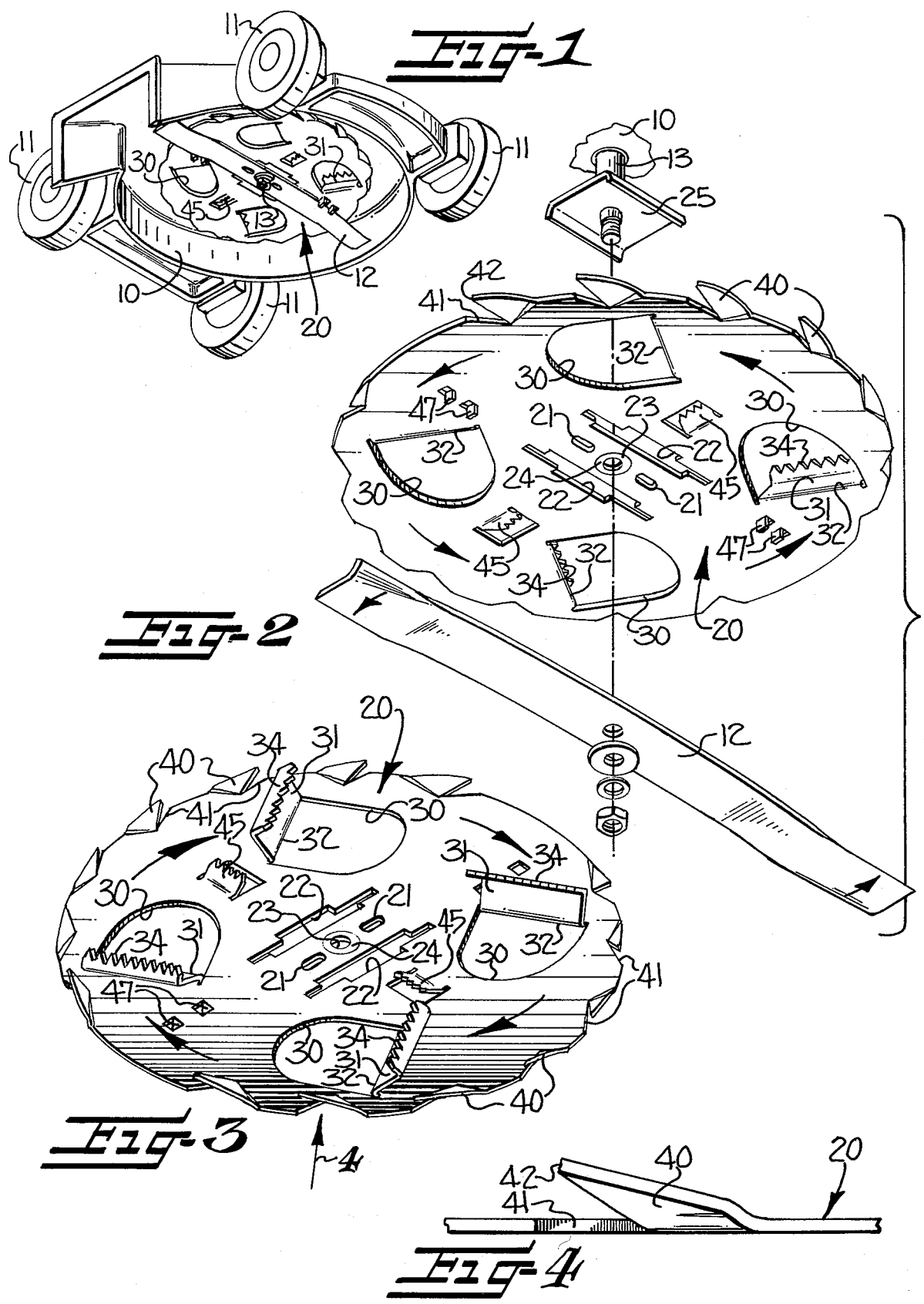

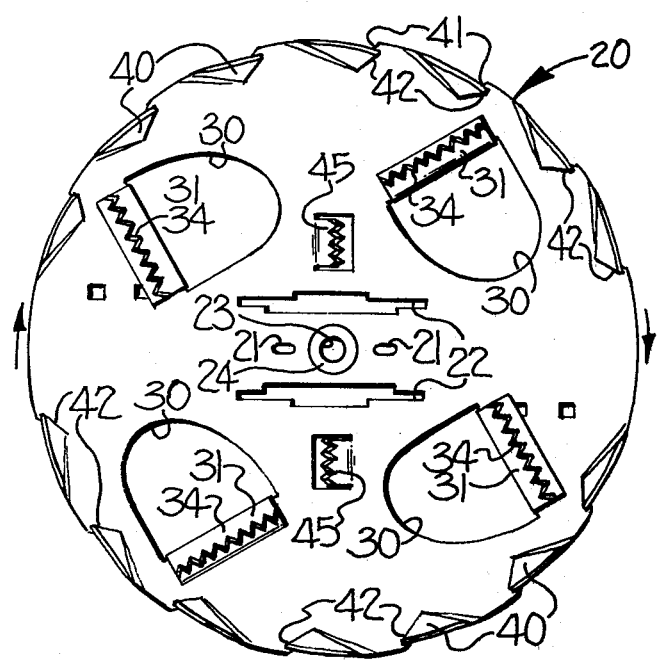
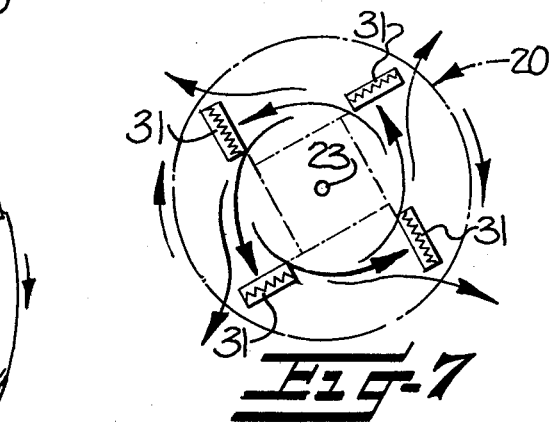
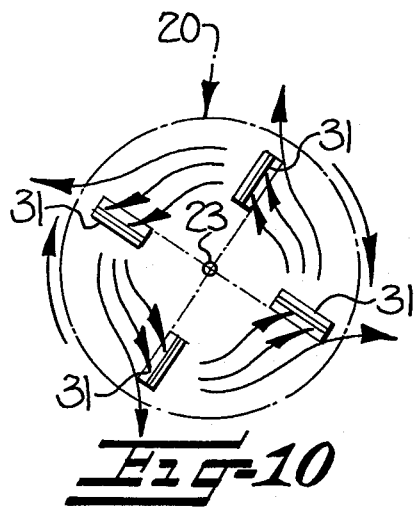
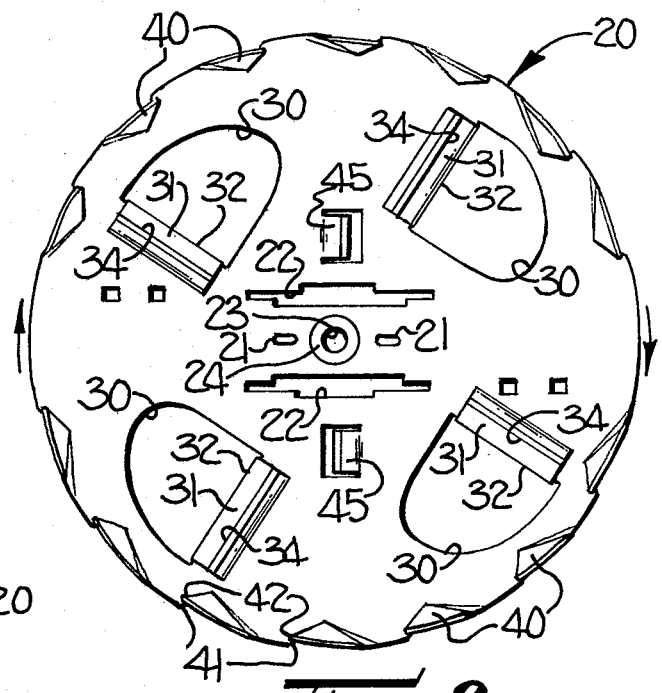
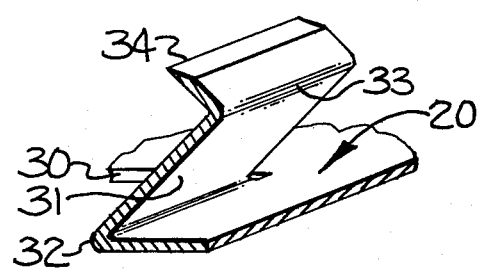

MULCHER ATTACHMENT FOR ROTARY POWER MOWER

This invention relates to rotary power lawnmowers, and more particularly to a mulcher attachment for use with rotary mowers and which is effective for shredding and mulching grass clippings, leaves and other materials during operation of the mower.

It is often desirable that a rotary power mower be capable of not only cutting the grass, but also chopping the grass clippings, leaves and other debris into finely ground particles to serve as mulch. Some types of rotary mowers are designed particularly for mulching and employ a blade housing without any discharge chute so that the grass clippings, leaves and the like are confined inside the housing and are repeatedly contacted by the rotating mower blade. Other rotary mowers provide means for blocking the discharge chute of the blade housing when mulching is desired. There have also been proposed certain attachments for use with rotary mowers to accomplish mulching. For example, as shown in Clark U.S. Pat. No. 2,663,984, a stationary screen attachment is mounted in the blade housing enclosing the rotating blade and serving to confine the clippings in contact with the blade until they are chopped fine enough to pass through the openings in the screen.

These types of mowers and attachments are not particularly suited for use in excessively long grass or in wet grass since the clippings tend to accumulate inside the blade housing and stall the mower. Also, since these mowers and attachments are not provided with or do not use a discharge chute through which the shredded clippings, leaves, and the like are expelled, these materials are often deposited by the mower on the lawn in unsightly clumps, necessitating raking, rather than being scattered across the lawn. Additionally, the lack of any discharge chute precludes the use of a bagging attachment for collecting the chopped clippings.

It is an object of the present invention to provide a mulcher device which overcomes the aforementioned disadvantages and limitations associated with the prior types of mulching mowers and mulching attachments.

More particularly, it is an object of this invention to provide an attachment for use on rotary power lawn mowers which is effective for finely shredding grass clipping, leaves, and other debris during operation of the mower without interfering with the normal operation of the mower.

The mulcher attachment of the present invention is in the form of a disc which is mounted on the drive shaft of a rotary mower alongside the mower blade and which rotates with the blade. Preferably, the disc is mounted above the mower blade inside the blade housing. The disc has a diameter less than the length of the mower blade so that the end portions of the blade protrude beyond the periphery of the disc. In operation, the blade contacts the grass first and cuts the same, and the mulcher disc thereafter serves to comminute the clippings into fine particles.

The disc has a plurality of realtively large openings therein with an impeller blade provided alongside each opening. The impeller blades extend upwardly at an angle and are adapted for inducing a flow of air upwardly through the openings when the disc rotates producing a vacuum effect for drawing grass clippings, leaves and other debris upwardly through the openings. Cutting means is provided on the upper side of the disc for cutting and shredding the grass clippings, leaves and debris which are drawn through the openings into the area between the disc and the blade housing.

The cutting means may take the form of peripheral shredder blades integrally formed along the outer periphery of the blade and having cutting edges extending above the upper surface of the blade. These blades cut and shred the grass clippings leaves and other debris as these materials are cast centrifugally outwardly from the disc during rotation of the disc. The cutting means may also take the form of cutting edges provided along the uppermost extremity of the impeller blades which contact the clippings, leaves and other waste as these materials are drawn upwardly through the openings.

The clippings are expelled from the mower through the discharge chute provided in the blade housing, and may either be scattered over the lawn or may be collected with a bagging attachment in the conventional manner.

The increased vacuum effect created by the impeller blades of the mulcher attachment enhances the operation of the mower by lifting the blades of grass to a more erect condition prior to cutting, thereby obtaining a more uniform level of cutting, and at the same time picking up and shredding any leaves which may be present on the lawn.

The capability of using the mulcher attachment without interfering with the use of a bagging attachment is most advantageous, as this allows for collecting the shredded clippings while using the mower, and thereafter depositing them elsewhere, such as in a garden or compost pile for example. Moreover, the mulcher attachment of this invention actually improves the operation of the bagging attachment. By reducing the clippings to finely ground particles, the collection bag is capable of holding a greater amount of clippings and requires less frequent emptying. Anyone familiar with the use of bagging attachments on power mowers will recognize the substantial amount of time which would be saved by emptying the collection bag less frequently. Additionally, the increased vacuum effect created by the mulcher attachment assists in drawing more of the clippings, leaves and other debris from the surface of the lawn and depositing the same in the collection bag.

Some of the objects, features and advantages of the invention having been stated, others will appear as the description proceeds when taken in connection with the accompanying drawings, in which:

FIG. 1 is a perspective view of the underside of a rotary power mower showing a mulcher attachment in accordance with the present invention installed alongside the mower blade;

FIG. 2 is an enlarged exploded perspective view showing the way in which the mulcher attachment of this invention may be mounted to the drive shaft of a rotary mower with the blade;

FIG. 3 is a perspective view showing the upper side of a mulcher attachment in accordance with one embodiment of this invention;

FIG. 4 is a further enlarged side view showing one of the peripheral shredder blades;

FIG. 5 is an enlarged perspective view showing one of the impeller blades and the serrated cutting edge thereon;

FIG. 6 is a top plan view of the mulcher attachment of FIG. 3;

FIG. 7 is a reduced top plan view schematically illustrating the path of travel of the clippings across the mulcher attachment;

FIG. 8 is a top plan view showing the upper side of a mulcher attachment in accordance with a second embodiment of the invention;

FIG. 9 is an enlarged perspective view showing one of the impeller blades on the mulcher attachment of FIG. 8 and the smooth cutting edge thereon; and FIG. 10 is a schematic top plan view similar to FIG. 7, but illustrating the path of travel of the clippings across the mulcher attachment of the form illustrated in FIG. 8.

Referring now more particularly to the drawings, and first to FIG. 1 thereof, reference character 10 designates the blade housing of a conventional rotary power lawnmower which is adapted for movement across a lawn on wheels 11 mounted to the blade housing. An elongate mower blade 12 is mounted to a drive shaft 13 and is adapted for rotation inside the blade housing 10 in the direction indicated by the arrows. The drive shaft 13 may comprise the output shaft of a conventional electric or gasoline powered mower engine.

The mulcher attachment, generally designated by the reference character 10, is mounted on the drive shaft alongside the mower blade 12 for rotation with the blade inside the housing 10. Preferably, and as illustrated, the mulcher attachment 20 is mounted on shaft 13 above the mower blade 12 so that the underlying blade 12 protects the mulcher attachment 20 from contact with stumps, rocks, pipes or other heavy foreign objects. In this arrangement, the cutting edge of the mower blade 12 is disposed slightly below the lower surface of the mulcher attachment 20. However, acceptable results may be obtained with the mulcher attachment 20 mounted below the mower blade 12.

Numerous different mounting arrangements are used by the various mower maufacturers for mounting the mower blade to the output shaft of the mower engine. The mulcher attachment of the present invention is designed to be compatible with a large number of conventional blade mounting arrangements, and for this purpose relatively short slots 21 and elongate slots 22 are provided adjacent the center of the mulcher attachment for cooperating with the blade mounting members of the various mower manufacturers. Additionally, the mounting hole 23 at the center of the mulcher attachment is provided with a removable knockout washer 24 which may be replaced by similar knockout washers of other hole diameters for thereby adapting the mulcher attachment for use with various diameter output shafts.

One conventional blade mounting arrangement is shown in FIG. 2 in exploded relation. As illustrated, a flanged blade support member 25 is mounted on the output shaft 13 of the mower engine and is keyed or otherwise suitably secured thereto so as to rotate with the shaft. The opposing depending flange portions of the support member 25 normally straddle the elongate mower blade to prevent rotation of the blade relative to the shaft. When the mulcher attachment 22 is mounted on the mower, the flange portions of the blade support member 25 pass through the elongate slots 22 in the mulcher attachment and secure both the blade and the mulcher attachment against rotational movement relative to the shaft 13.

The mulcher attachment 20 is in the form of a circular disc having a diameter less than the length of the mower blade so that the end portions of the mower blade protrude beyond the periphery of the disc and serve their normal cutting function. In this regard, it has been determined that in the operation of a rotary power mower, the outermost tip portions of the mower blade accomplish most of the cutting as the mower is advanced across the lawn, with inner portions of the blade being significantly less effective in cutting.

The disc-like mulcher attachment is preferably formed of a suitable thin metallic sheet material such as steel or aluminum and is provided with a plurality of realtively large openings 30 struck out from the disc at spaced locations therearound. As illustrated, the openings are of substantially equal size and are provided at uniformly spaced locations around the disc to maintain a uniform weight distribution in the disc thereby avoiding vibration during rotation of the disc. The openings are of sufficient size to allow clippings, leaves and other debris to be drawn upwardly therethrough during operation of the mower as described more fully hereinafter. In this regard, it has been determined that four openings of a size such as to collectively constitute approximately one-fifth of the total area of the disc provide sufficiently large open area for this purpose without adversely affecting the structural soundness of the disc under the high rotational speeds to which it is normally subjected.

An upwardly extending impeller blade 31 is provided on the mulcher attachment 20 adjacent each of the openings therein. Preferably, the impeller blade in integrally formed with the disc from the material struck out from the openings 30, and extends angularly upwardly in a rotationally rearward direction from a bend 32 along the rotationally trailing edge of the respective openings. As illustrated, the bend 32 defines a 45° angle between the plane of the blade and the plane of the disc.

As the mulcher attachment 20 rotates during operation of the mower, the impeller blades 31 induce an upward current of air through the openings 30 drawing clippings, leaves, and other relatively light weight waste materials therewith. These materials pass upwardly through the openings in the disc into an area between the upper surface of the mulcher attachment and the blade housing. Here they are contacted by upstanding cutting edges, to be described presently, which are carried by the rotating disc. The materials are shredded into fine particles, cast outwardly by the centrifugal force of the rotating disc, and discharged through the discharge chute of the mower.

As best seen in FIGS. 3 and 5, a bend 33 is formed in each impeller blade above the bend 32 and adjacent the upper extremity of the blade. The bend 33 is in the forward rotational direction to position the uppermost edge 34 of the blade rotationally forwardly of the bend 33. Preferably, the bend 33 is approximately a right angle bend and positions the uppermost edge 34 rotationally rearwardly of the bend 32 and forwardly of the bend 33. The uppermost edge 34 thus serves as a cutting edge for cutting and shredding the clippings, leaves and other waste as these materials are drawn upwardly through the openings during rotation of the disc. Edge 34 is desirably sharpened to facilitate cutting these materials as they pass upwardly through the disc, and in accordance with one embodiment of the invention, as shown in FIG. 5, the sharpened cutting edge is serrated to enhance the cutting action by providing a number of sharp points along the cutting edge as well as by increasing the effective length thereof. Alternatively, in accordance with another embodiment of the invention as shown in FIG. 9, the edge 34 may comprise a smooth sharpened cutting edge.

The disc is also preferably provided with series of upturned shredder blades 40 along the peripheral edge thereof. The shredder blades are integrally formed with the disc and have cutting edges which extend above the upper surface of the disc for shredding and mulching the clippings, leaves and waste as these materials are cast centrifugally outwardly during rotation of the disc. As illustrated, the shredder blades 40 are spaced substantially equal distances from one another around the periphery of the disc except for areas on diametrically opposite sides of the disc where the mower blade extends therebeyond.

Referring more particularly to the construction of the shredder blades, it will be seen that a series of slots 41 is provided along the peripheral edge of the disc, with each slot extending angularly inwardly from the periphery of the disc and the rearward rotational direction. The shredder blades 40 comprise upstanding generally triangular segments defined by angularly upturned peripheral portions of the disc located adjacent the slots. The inner facing edge 42 of each shredder blade 40 where the slot was formed defines a cutting edge positioned for contacting the clippings, leaves and waste as these materials are cast outwardly during rotation of the disc.

The mulcher attachment 20 may also be provided with a pair of relatively small cutting members 45 to provide additional mulching and shredding of the materials passing across the upper side of the mulcher attachment. As illustrated, the cutting members 45 are integrally formed from the material of the disc by producing a U-shaped cut in the disc and by bending the material enclosed therein angularly upwardly. As illustrated, the uppermost edge of the cutting members 45 are serrated and defines a cutting edge.

Additionally, relatively small stabilizing tabs 47 are desirably formed in the disc and extending from the lower surface of the disc for engaging the mower blade 12 and preventing relative movement between the mower blade and the mulcher attachment 20.

In the preferred embodiment of the invention illustrated in FIGS. 1 to 7, the openings 30 are so located in the disc that the adjacent impeller blades 31 are in an offset relation relative to the radial direction of the disc. More particularly as best seen in FIG. 6, the rotationally trailing edge of each of the openings 30 is offset rotationally rearwardly from a radius of the disc drawn parallel to the rotationally trailing edge of the opening. The impeller blades are bent angularly upwardly along this trailing edge and are thereby oriented in a direction extending parallel to the radius of the disc and rotationally rearwardly offset therefrom.

This orientation of the openings 30 and impeller blades 31 permits the mower blade 12 to extend across the disc without obstructing any of the openings. Additionally, and as illustrated in FIG. 7, this particular orientation of the impeller blades enhances the mulching and shredding by deflecting some of the materials inwardly toward the center of the disc and into the path of the next approaching impeller blade for being further contacted by the cutting edge carried thereby. Ultimately the materials are cast outwardly by the centrifugal force of the rotating disc. It has been observed that a highly effective recirculating action is achieved when the impeller blades are rearwardly offset from the radius a distance corresponding to approximately ⅛ the radial dimension.

In accordance with the second embodiment of the invention as illustrated in FIGS. 8–10, the openings, impeller blades, and shredder blades are constructed substantially as described above, except that the impeller blades are oriented along the radial dimension rather than being offset therefrom. As illustrated in FIG. 10, this results in most of the materials contacting the impeller blades being deflected outwardly into contact with the peripheral shredder blades.

In the drawings and specification, there have been set forth preferred embodiment of the invention, and although specific terms are employed, they are used in a generic and descriptive sense only and not for purposes of limitation.

That which is claimed is:

1. A mulcher attachment for use with a rotary mower for shredding and mulching clippings and leaves during operation of the mower, said mulcher attachment comprising
    a circular disc having a centrally located mounting hole for securement of the disc to the drive shaft of a rotary mower for rotation alongside the mower cutting blade,
    a plurality of relatively large openings at spaced locations around the disc,
    a plurality of impeller blades extending upwardly from the disc and adapted for inducing a flow of air upwardly through said openings as the disc rotates while drawing clippings and leaves therewith, and
    a series of shredder blades integrally formed along the peripheral edge of the disc and having cutting edges extending above the upper surface of the disc adapted for shredding and mulching the clippings and leaves cast centrifugally outwardly during rotation of the disc.

2. The mulcher attachment according to claim 1 wherein said impeller blades are integrally formed from the material of said disc along one edge of each respective opening.

3. The mulcher attachment according to claim 2 wherein said impeller blades are located along the rotationally trailing edge of each respective opening and extend angularly upwardly in a rotationally rearward direction.

4. The mulcher attachment according to claim 3 wherein uppermost portions of said impeller blades have portions thereof which extend in the forward rotational direction and define a cutting edge for cutting and shredding the clippings and leaves drawn upwardly through the openings.

5. The mulcher attachment according to claim 2 wherein the rotationally trailing edge of each of said openings extends along a line parallel to a radius of the disc and rotationally rearwardly offset therefrom, and wherein said impeller blades are formed of material of the disc struck out from said openings and bent angularly upwardly along said line.

6. The mulcher attachment according to claim 1 wherein said disc has a series of slots therein extending from the peripheral edge of the disc and angularly inwardly therefrom in the rearward rotational direction, and wherein said shredder blades comprise upstanding generally triangular segments defined by upturned portions of the disc located adjacent said slots.

7. A mulcher attachment for use with a rotary mower for shredding and mulching clippings and leaves during operation of the mower, said mulcher attachment comprising a circular disc having a centrally located mounting hole for securement of the disc to the drive shaft of a rotary mower for rotation alongside the mower cutting blade, a plurality of relatively large openings at spaced locations around the disc, an elongate impeller blade integrally formed with said disc from the material struck out from each of said openings, each said blade extending angularly upwardly in a rotationally rearward direction from a bend along the rotationally trailing edge of the respective opening, and each said blade being adapted for inducing a flow of air upwardly through the respective opening as the disc rotates while drawing clippings and leaves therewith, and a bend formed in each said impeller blade adjacent the upper extremity thereof with portions of the blade extending therefrom in a rotationally forward direction, the uppermost edge of said blade being positioned rotationally forwardly of said bend and defining a cutting edge for cutting and shredding the clippings and leaves drawn upwardly through the openings during rotation of the disc.

8. A mulcher attachment for use with a rotary mower for shredding and mulching clippings and leaves during operation of the mower, said mulcher attachment comprising a circular disc having a centrally located mounting hole to permit securing the disc to the drive shaft of a rotary mower for rotation alongside the mower cutting blade, a plurality of relatively large openings of substantially equal size provided at uniformly spaced locations around the disc, an upturned elongate impeller blade integrally formed from said disc along the rotationally trailing edge of each of said openings and adapted for inducing a flow of air upwardly through the openings as the disc rotates while drawing clippings and leaves therewith, a series of slots extending from the peripheral edge of the disc and angularly inwardly therefrom in the rearward rotational direction, and respective peripheral shredder blades defined by angularly upturned peripheral portions of the disc located adjacent said slots, said blades having cutting edges located above the upper surface of the disc adapted for shredding and mulching the clippings and leaves cast centrifugally outwardly during the rotation of the disc.

9. The mulcher attachment according to claim 8 wherein the rotationally trailing edge of each of said openings is offset rotationally rearwardly from a radius of the disc drawn parallel to said edge, and said upturned impeller blades are formed of material of the disc struck out from said openings and bent angularly upwardly and rearwardly along said rotationally trailing edge of the opening, uppermost portions of said impeller blades having a bend therein and extending in the forward rotational direction and defining a cutting edge for cutting and shredding the clippings and leaves drawn upwardly through the openings.

10. In a rotary mower of the type having an enclosed blade housing, a vertically disposed rotatable drive shaft extending into said blade housing, and an elongate mower blade carried by said drive shaft for rotation in said blade housing, the combination therewith of a mulcher attachment for shredding and mulching clippings and leaves during operation of the mower, said mulcher attachment comprising a circular disc mounted on said drive shaft for rotation in the blade housing alongside the mower blade, said disc having a diameter less than the length of said mower blade so that the end portions of the mower blade protrude beyond the periphery of the disc, a plurality of relatively large openings at spaced locations around the disc, an upwardly extending impeller blade adjacent each of said relatively large openings an adapted for inducing a flow of air upwardly through the opening as the disc rotates while drawing clippings and leaves therewith into an area between the disc and the blade housing, and a series of shredder blades integrally formed along the peripheral edge of the disc and having cutting edges extending above the upper surface of the disc adapted for shredding and mulching the clippings and leaves cast centrifugally outwardly during the rotation of the disc.

11. The combination according to claim 10 wherein said disc is mounted above said mower blade with the lower surface of the disc engaging the upper surface of the mower blade.

12. In a rotary mower of the type having an enclosed blade housing, a vertically disposed rotatable drive shaft extending into said blade housing, and an elongate mower blade carried by said blade shaft for rotation in said blade housing, the combination therewith of a mulcher attachment for shredding and mulching clippings and leaves during operation of the mower, said attachment comprising a circular disc mounted on said dirve shaft for rotation in the blade housing alongside the mower blade, said disc having a diameter less than the length of said mower blade so that end portions of the mower blade protrude beyond the periphery of the disc, a plurality of relatively large openings at spaced locations around the disc, an elongate impeller blade integrally formed with said disc from the material struck out from each of said openings, each said impeller blade extending angularly upwardly in a rotationally rearward direction from a bend along the rotationally trailing edge of the respective opening, and each said blade being adapted for inducing a flow of air upwardly through the respective opening as the disc rotates while drawing clippings and leaves therewith, and a bend formed in each said impeller blade adjacent the upper extremity thereof with portions of the blade extending therefrom in a rotationally forward direction, the uppermost edge of said blade being positioned rotationally forwardly of said bend and defining a cutting edge for cutting and shredding the clippings and leaves drawn upwardly through the openings during rotation of the disc.

* * * * *

UNITED STATES PATENT AND TRADEMARK OFFICE
CERTIFICATE OF CORRECTION

PATENT NO. : 4,083,166

DATED : April 11, 1978

INVENTOR(S) : Phil (NMI) Haas

It is certified that error appears in the above-identified patent and that said Letters Patent are hereby corrected as shown below:

Column 3, Line 25, the numeral "10" should be --20--.
Column 4, Line 11 "realtive" should be --relatively--; same column, Line 28, "in" should be --is--. Column 6, Line 13, "embodiment" should be --embodiments--. Column 8, Line 18, CLAIM 10, "an" should be --and--; same column, Line 41, CLAIM 12, "dirve" should be --drive--.

Signed and Sealed this

Fifth Day of September 1978

[SEAL]

Attest:

RUTH C. MASON
*Attesting Officer*

DONALD W. BANNER
*Commissioner of Patents and Trademarks*